US005338131A

United States Patent [19]
Bestmann

[11] Patent Number: 5,338,131
[45] Date of Patent: Aug. 16, 1994

[54] ARRANGEMENT FOR SHORELINE CONSTRUCTION, MAINTENANCE, AND PROTECTION, AND METHODS FOR MAKING AND USING THE SAME

[76] Inventor: Lothar Bestmann, Pinneberger, Strasse 203, D-2000 Wedel/Holst., Fed. Rep. of Germany

[21] Appl. No.: 43,272

[22] Filed: Apr. 6, 1993

Related U.S. Application Data

[63] Continuation-in-part of Ser. No. 886,693, May 21, 1992, abandoned.

[51] Int. Cl.$^5$ .............................................. E02B 3/04
[52] U.S. Cl. ...................................... 405/24; 405/15; 405/16; 405/21; 405/25
[58] Field of Search ................... 405/15, 16, 21–35

[56] References Cited

U.S. PATENT DOCUMENTS

| | | | |
|---|---|---|---|
| 331,127 | 11/1885 | Goodridge | 405/21 |
| 486,887 | 11/1892 | Neale | 405/16 |
| 591,256 | 10/1897 | Hunley et al. | 405/15 |
| 774,901 | 11/1904 | Wright | 405/15 |
| 855,584 | 6/1907 | Neale | 405/16 |
| 864,481 | 8/1907 | Neale | 405/21 X |
| 909,423 | 1/1909 | Keller | 405/21 X |
| 1,168,547 | 1/1916 | Pedley | 405/15 |
| 2,201,279 | 5/1940 | Willing | 405/15 |
| 4,345,856 | 8/1982 | Tuck | 405/15 |
| 5,035,080 | 7/1991 | Kafka | 47/64 X |

FOREIGN PATENT DOCUMENTS 92105015 11/1992 European Pat. Off. .

OTHER PUBLICATIONS

Translation of excerpts from DE No. 3917357A1 by Wendi Goldsmith.

Primary Examiner—Dennis L. Taylor
Attorney, Agent, or Firm—Richard P. Crowley

[57] ABSTRACT

An arrangement for the construction, maintenance and protection of a shoreline having a variable level of water is disclosed. The arrangement utilizes a plurality of ecological-botanical elements (12, 13, 14, 16, 17, 26, and 30 implanted among construction materials (10, 11, 15, 18, 19, 20, 21, 22, 24, 25, 27, 28, 29, 31, and 32) for stabilization and maintenance of shoreline shape and location. The ecological-botanical elements comprise precultivated, emergent aquatic plants (14) called plant plugs (12) whose roots are held within a water-permeable, biodegradable vegetative carrier system (13). Another ecological-botanical element is a fiber roll (17) comprising slowly decaying fibrous material in which are rooted precultivated, emergent aquatic plants (14). Appropriately arranged combinations of ecological-botanical elements implanted among construction materials stabilize and maintain shorelines.

28 Claims, 8 Drawing Sheets

ARRANGEMENT FOR SHORELINE CONSTRUCTION, MAINTENANCE, AND PROTECTION, AND METHODS FOR MAKING AND USING THE SAME

REFERENCE TO PRIOR APPLICATIONS

Reference is made to a prior application. This application is a continuation-in-part of United States Patent and Trademark Office Ser. No. 07/886,693 filed May 21, 1992, now abandoned, which claims priority from European Patent Application No. 92105015.9, filed Mar. 24, 1992.

BACKGROUND OF THE INVENTION

Water transfers its dynamic forces to the surrounding shoreline or to the bottom of a body of water whenever currents or wave movements occur. Particles within water beds and shorelines are carried away and deposited elsewhere, resulting in sedimentation and erosion.

Attempts to halt sedimentation and erosion have thus far utilized construction materials to form pilings, retaining walls and sheet pilings. These were the elements of choice for stabilizing shapes and positions of ocean, lake and river shorelines. However, such construction elements used alone were neither in harmony with nature nor long-lived.

In the more recent past some efforts were made to utilize seeds for stabilizing embankments along dams and shorelines. However, germination could only occur during certain seasons of the year and only under the most favorable conditions. Such seeds rarely germinated in sufficient numbers to provide reliable vegetative growth.

What is needed is an approach for stabilizing and protecting shorelines that would use ecologically compatible vegetative growth with structurally reinforcing construction materials in a variety of arrangements to accommodate different topographies.

SUMMARY OF THE INVENTION

The present invention relates to an arrangement for shoreline construction, maintenance, and protection, processes of preparation and methods of use of the same. In particular, the invention concerns plant plugs and fiber rolls as ecological-botanical elements implanted among construction materials, processes of arrangement and methods of use for preventing shoreline erosion.

In one embodiment, plant plugs consisting of at least two precultivated, emergent aquatic plants have their roots contained within a biodegradable, water-permeable vegetative carrier. Such plant plugs are placed within riprap on shores to maintain shoreline positions.

Another embodiment comprises plant plugs and fiber rolls appropriately placed on a shore to provide protection for the shore. Fiber rolls include decaying fibrous material with precultivated, emergent aquatic plants rooted within the fibrous material. Fiber rolls are placed at high or low water marks with plant plugs placed among riprap higher on shore to provide protection from erosion. Another embodiment utilizing fiber rolls in combination with sheet pilings includes a positioning ballast body connected to a supportive buoyancy body, in turn affixed to a fiber roll, thereby forming a floatable device. Such a device is then flexibly attached to a sheet piling. These floatable devices can serve as docks particularly in areas of varying water levels.

Other embodiments include plant carpets and plant pallets. Plant carpets include precultivated emergent aquatic plants arranged and secured by ropes and stakes during an initial rooting period to form carpets. The carpets can be rolled and used to cover large areas of shoreline. Plant pallets comprise precultivated, emergent aquatic plants arranged within an outer wrapping of netting. Such pallets can thickly cover large shoreline areas where needed. Plant carpets and plant pallets may each be attached to one another to form large ecological-botanical elements secured to shorelines by construction materials.

Other arrangements of fiber rolls include dam formations in which pilings are inclined at such angles so as to form an open-ended trapezoid containing a fiber roll on top of layers of brush. On steep shorelines, successive pilings of fiber rolls are placed on a submerged bag of stones held in position by pilings. On shallow shores, a single fiber roll is secured by a surrounding net held in place by pilings.

Any number of arrangements is possible using ecological-botanical elements that include precultivated, emergent aquatic plants in combination with construction materials.

DESCRIPTION OF THE EMBODIMENTS

Figure 1:
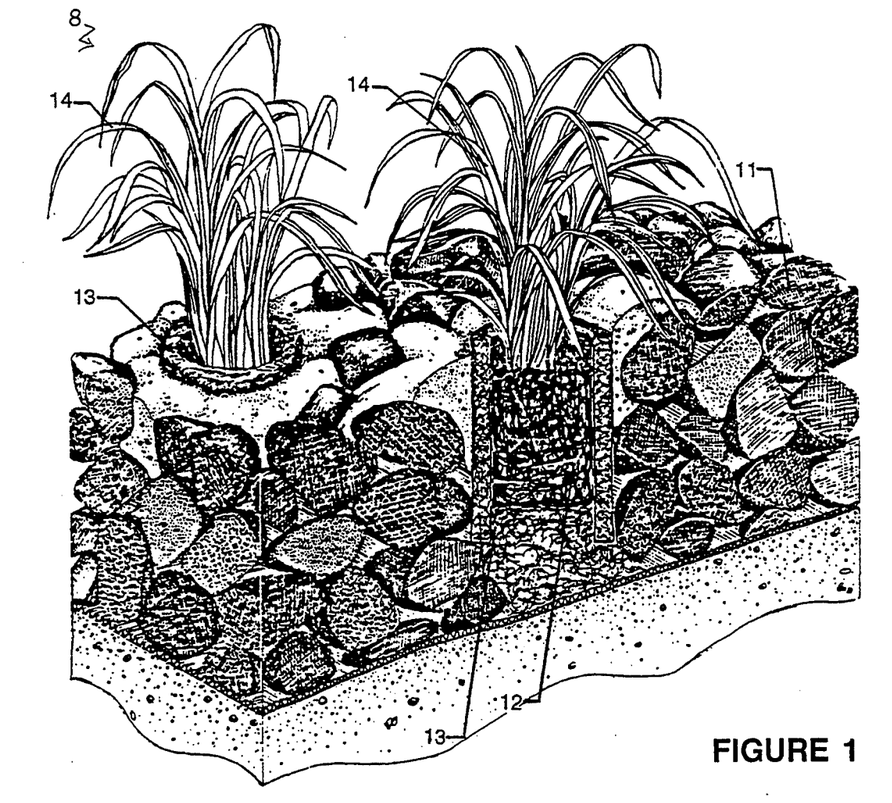
FIG. 1 is an oblique elevational perspective view of an embodiment of ecological-botanical elements of the subject invention.

Referring to the drawings in detail, an embodiment of an arrangement for shoreline construction, maintenance and protection is shown and is generally designated by the reference numeral 8. (See FIG. 1.) The invention basically comprises a plant plug (12) including emergent aquatic plants (14) held within a vegetative carrier system (13). The plant plug (12) may contain from as few as two to as many plants as desired. The number of plants within a given plant plug (12) will vary with the species selected which, in turn, is determined by the shoreline area to be protected. Emergent aquatic plants (14) are precultivated to eliminate vagaries of seed propagation and germination and to allow desired placement.

A vegetative carrier system (13) made of a biodegradable, water-permeable substance is used to contain and protect the roots of the emergent aquatic plants (14) comprising the plant plug (12). The vegetative carrier system (13) provides ease of handling plant plugs (12) such as when placing plant plugs (12) into riprap (11) on a shoreline. (See FIG. 1.)

Figure 2:
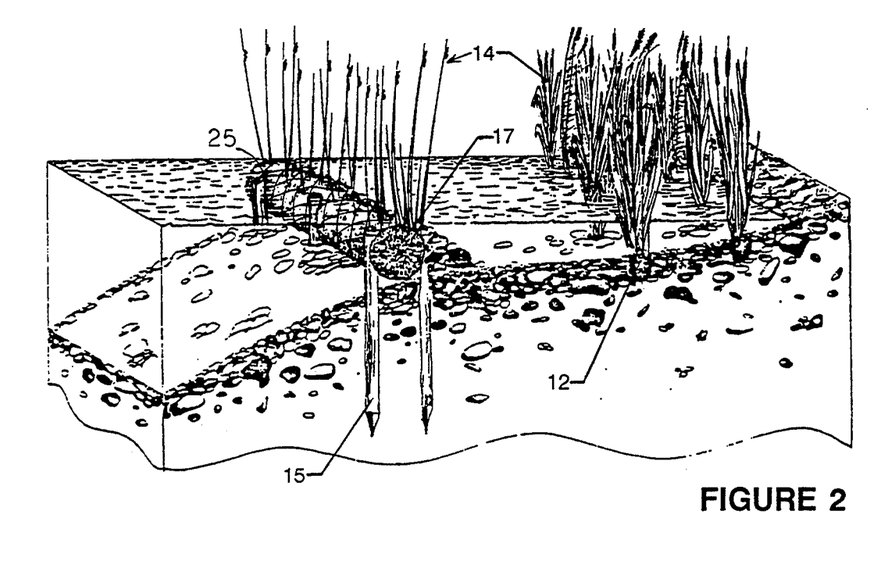
FIG. 2 is an oblique perspective view of another embodiment of ecological-botanical elements of the present invention.
Figures 3, 3A:
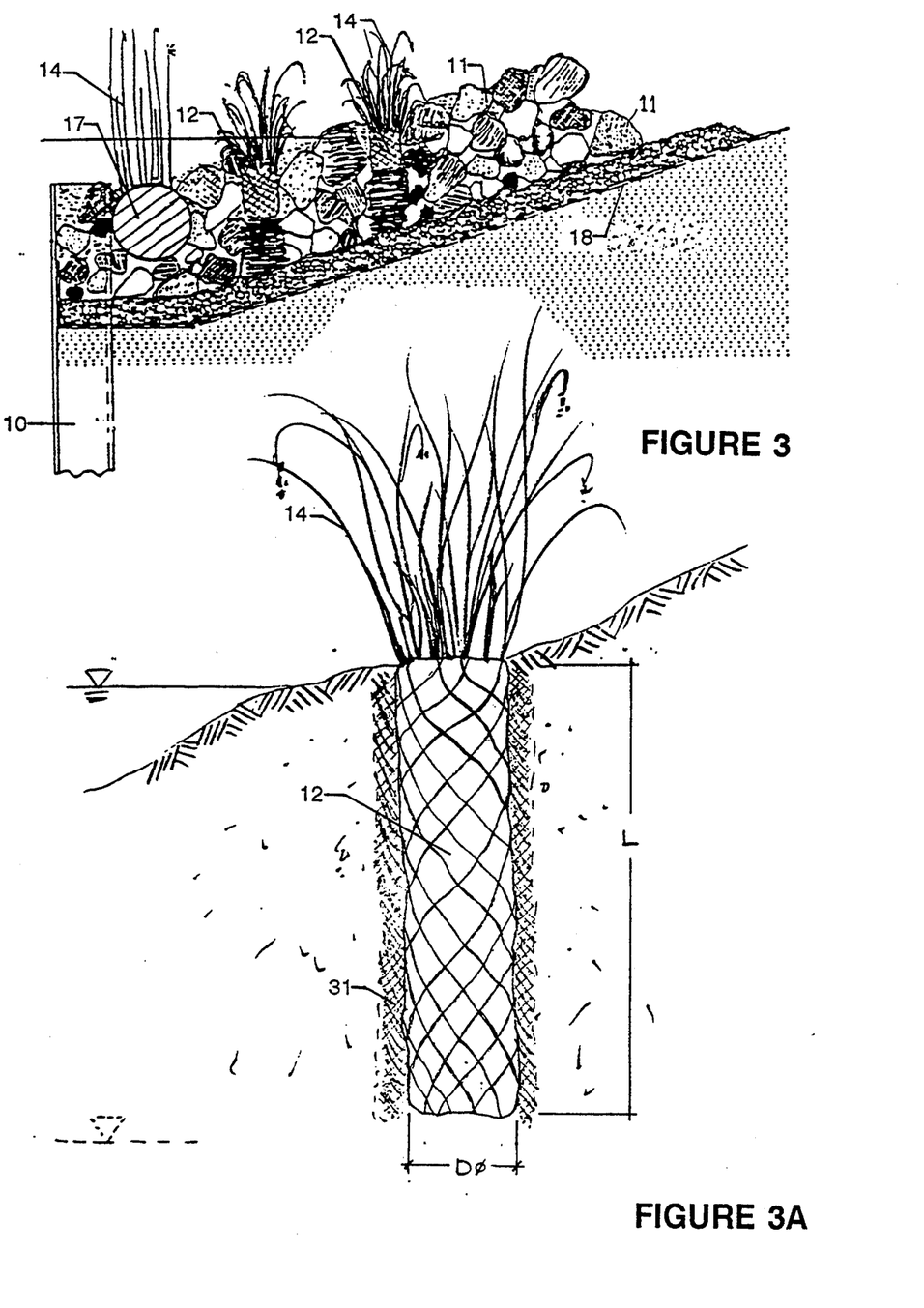
FIG. 3 is a cross-sectional view of an embodiment of FIG. 1.
FIG. 3A is a cross-sectional view of an embodiment of a plant plug.

As best shown in FIGS. 2 and 3, a second embodiment of the invention is the combined use of plant plugs (12) and fiber rolls (17) for shoreline maintenance and protection. Fiber rolls (17) comprise slowly decaying material such as coir held within a coarse mesh netting (25) into which are rooted precultivated emergent aquatic plants (14). Placement of fiber rolls (17) secured by pilings (15) close to an edge of a body of water and plant plugs (14) behind the fiber rolls provides shoreline protection especially at high or low water marks. (See FIGS. 2 and 3.) As shown in FIG. 3, a nonwoven filter (18) is used to underlay riprap (11) where plant plugs (12) and fiber rolls (17) containing precultivated emergent aquatic plants (14) are placed within the riprap (11). Such an arrangement is often used in conjunction with a wall or sheet piling (10).

FIG. 3A shows an embodiment of the invention for shorelines that experience extremes of water level fluctuation. Here, where areas of shoreline may at times be too dry to support plant life, the use of plant plugs (12) having a bulb length, L, to bulb diameter, D, ratio of at least 1:1 and preferably 2:1 allows the precultivated emergent aquatic plants (14) to obtain water through capillary action at their roots. A substrate material (31) of choice may be used to surround the plant plug (12).

Figure 4:
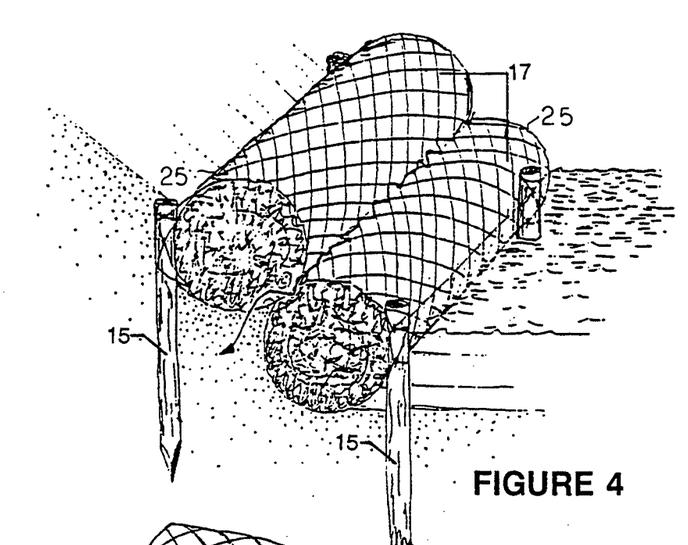
FIG. 4 is an oblique perspective view of a preferred embodiment of fiber rolls.
Figure 5:
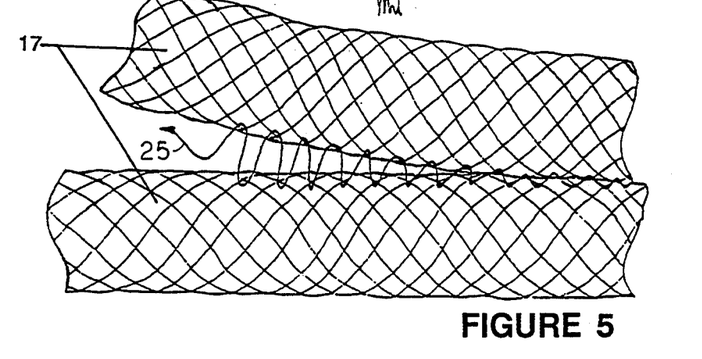
FIG. 5 is a top plan view of two fiber rolls joined by lacing.

FIGS. 4 and 5 show arrangements for attaching fiber rolls (17) to one another. In FIG. 4, an outer netting (25) is used to hold two fiber rolls (17) adjacent to one another. The fiber rolls (17) are secured by means of pilings (15) driven into a shoreline. In FIG. 5, fiber rolls (17) are attached to one another by a netting material (25) laced between them.

Figures 6, 7:
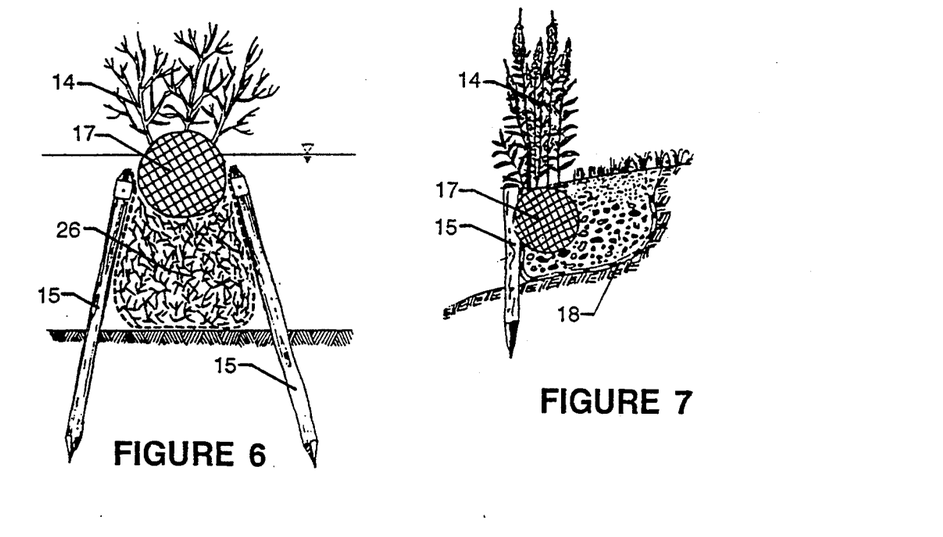
FIG. 6 is a cross-sectional view of an embodiment for dam construction.
FIG. 7 is a cross-sectional view of an embodiment for shoreline protection.

FIGS. 6, 7, 8, and 9 show different possible arrangements for fiber rolls (17) to accommodate different shoreline contours. As shown in FIG. 6, a vegetative off-shore dam is created by pilings (15) driven into a shoreline. The pilings (15) are inclined at angles to one another so as to form an open-ended trapezoidal shape. The trapezoidal shaper is then filled with brush layers (26) and a fiber roll (17) securely fixed to the top of the brush layers (26). Similarly, the shape of a shoreline can be maintained by placing a fiber roll (17) near the edge of the water and securing the fiber roll (17) in position by means of pilings (15). (See FIG. 7.) Sand and gravel may be layered over a non-woven filter (18) and placed behind the fiber roll (17) to further assure its position. Where steep slopes occur at shorelines, multiple layers of fiber rolls (17) each secured by stakes (19) and pilings (15), are placed on top of a submerged bag of stones, also held in position by pilings (15). (See FIG. 8.) In contrast, where shorelines having gradual slopes and shallow waters occur, fiber rolls (17) secured by nets (20) and pilings (15) provide sufficient protection for maintenance.

Figures 8, 9, 10:
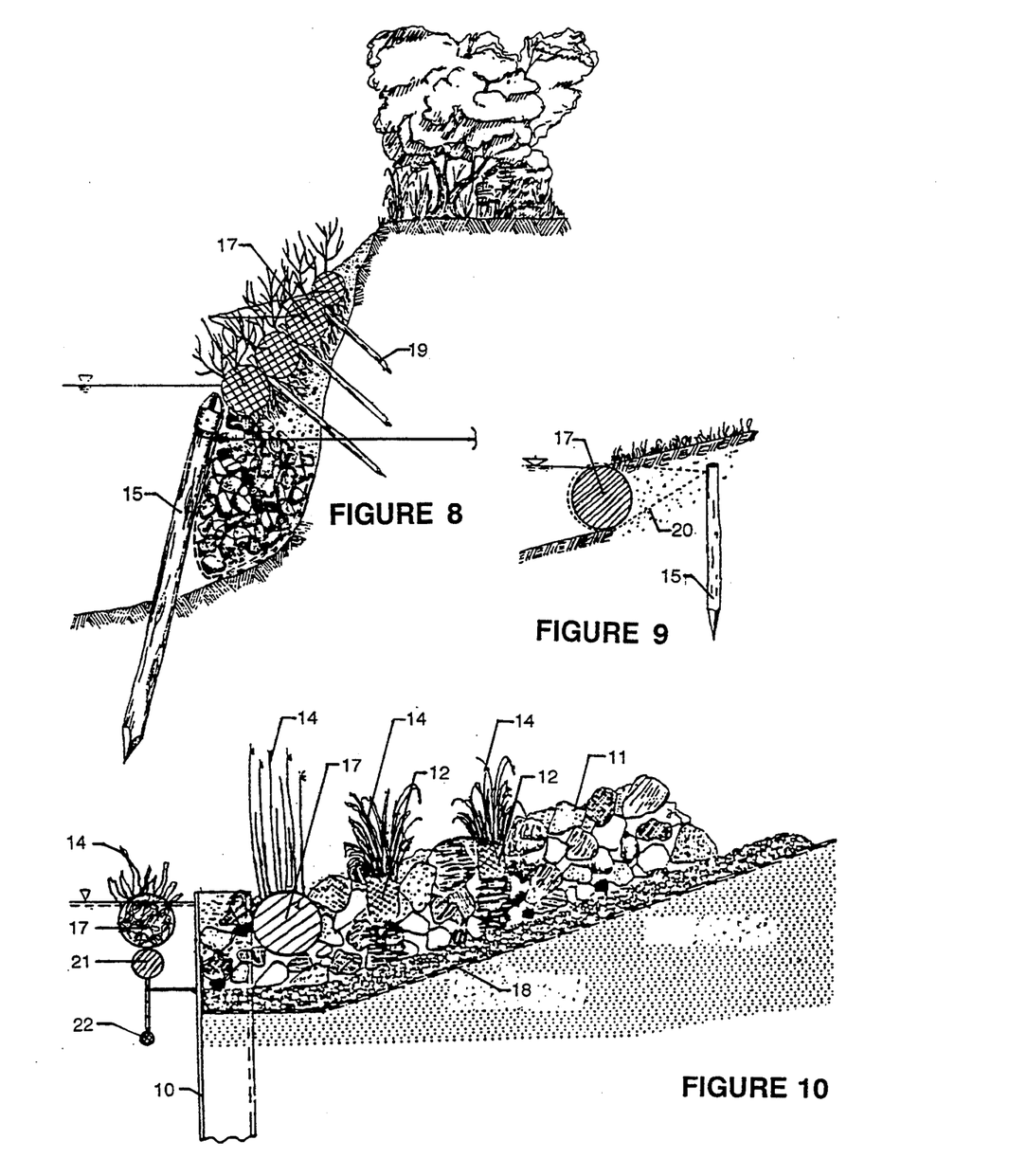
FIG. 8 is a cross-sectional view of an embodiment for steep shoreline slopes.
FIG. 9 is a cross-sectional view of an embodiment for gradual shoreline slopes.
FIG. 10 is a cross-sectional view of an embodiment for use with sheet piling construction materials.
Figure 11:
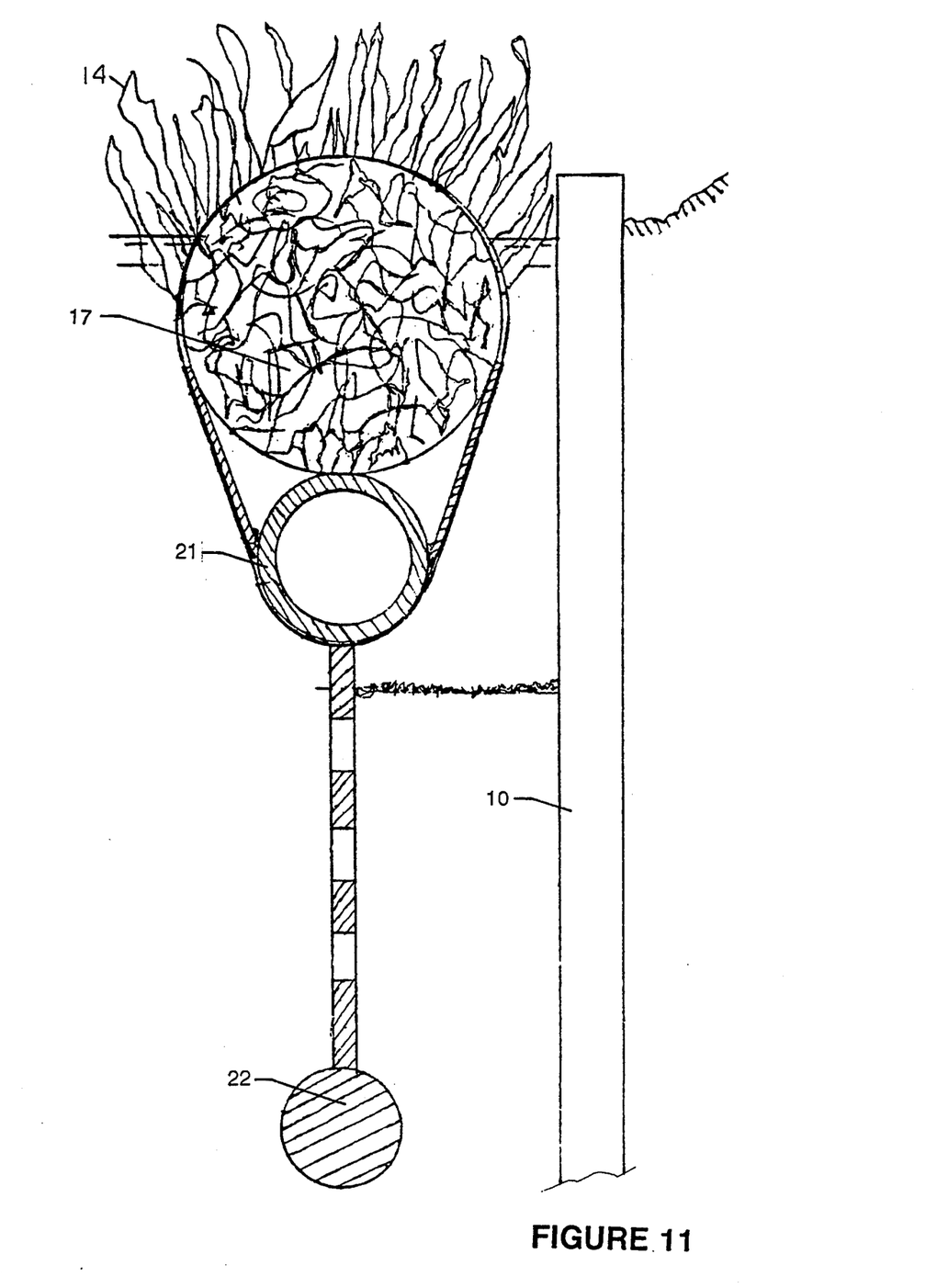
FIG. 11 is a cross-sectional view taken through a plane 11—11 of FIG. 10.

As seen in FIGS. 10 and 11, another embodiment comprises a sheet piling (10) retaining plant plugs (12), and fiber rolls (17) implanted among riprap (11) layered onto a non-woven filter (18) on a shoreline. Unique to this embodiment is a fiber roll (17) constructed as a floating element for adaptation to changes in water levels. A fiber roll (17) is affixed to a supportive buoyancy body (21) which, in turn, is attached to a ballast body (22). The fiber roll (17) floats as the surface of the water and the ballast body (22) stabilizes the position of the fiber roll (17). A flexible fastener provides attachment between the sheet piling (10) and the fiber roll (17), buoyancy body (21), and ballast body (22) in order to maintain a positional arrangement between the fiber roll (17) relative to the sheet piling (10).

Figure 12:
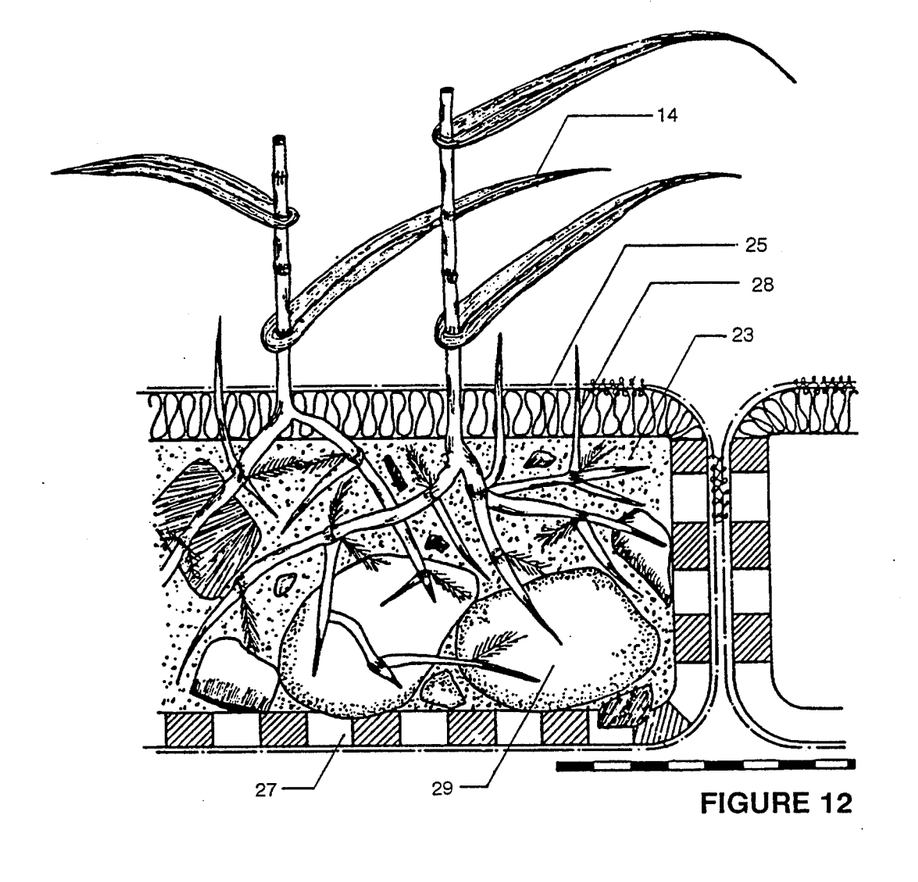
FIG. 12 is a cross-sectional view of yet another embodiment of the subject invention.

FIG. 12 shows an embodiment of a plant riprap (23). The plant riprap (23) includes outer thick layers of biodegradable non-woven felt (27) on three of its four sides and an inner substrate (29) containing precultivated, emergent aquatic plants (14). A humus-free gravel substrate is the substrate of choice though other substrates may be used. A non-woven geotextile (28) is placed over the substrate to prevent washing away of the substrate (29) and the precultivated, emergent aquatic plants (14) from the plant riprap (23). A nylon non-woven geotextile (28) is preferable although any geotextile would be acceptable for use in this arrangement. The total plant riprap (23) is surrounded by netting (25) to retain a desired shape. As seen in FIG. 12, a number of plant ripraps (23) may be connected to provide larger areas of coverage.

Figure 13:
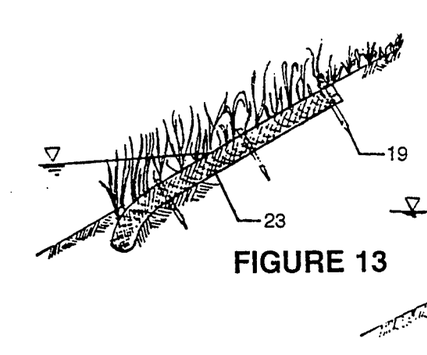
FIG. 13 is a cross-sectional perspective view of the embodiment of FIG. 12.
Figure 14:
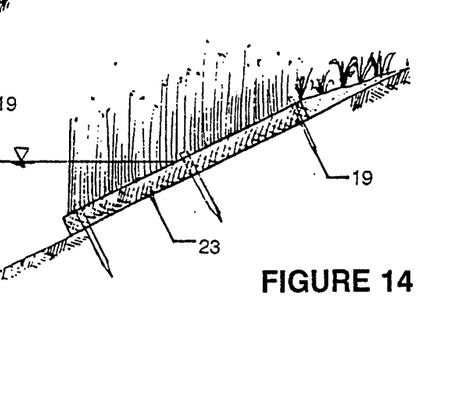
FIG. 14 is another cross-sectional perspective view of the embodiment of FIG. 12.
Figures 15, 16:
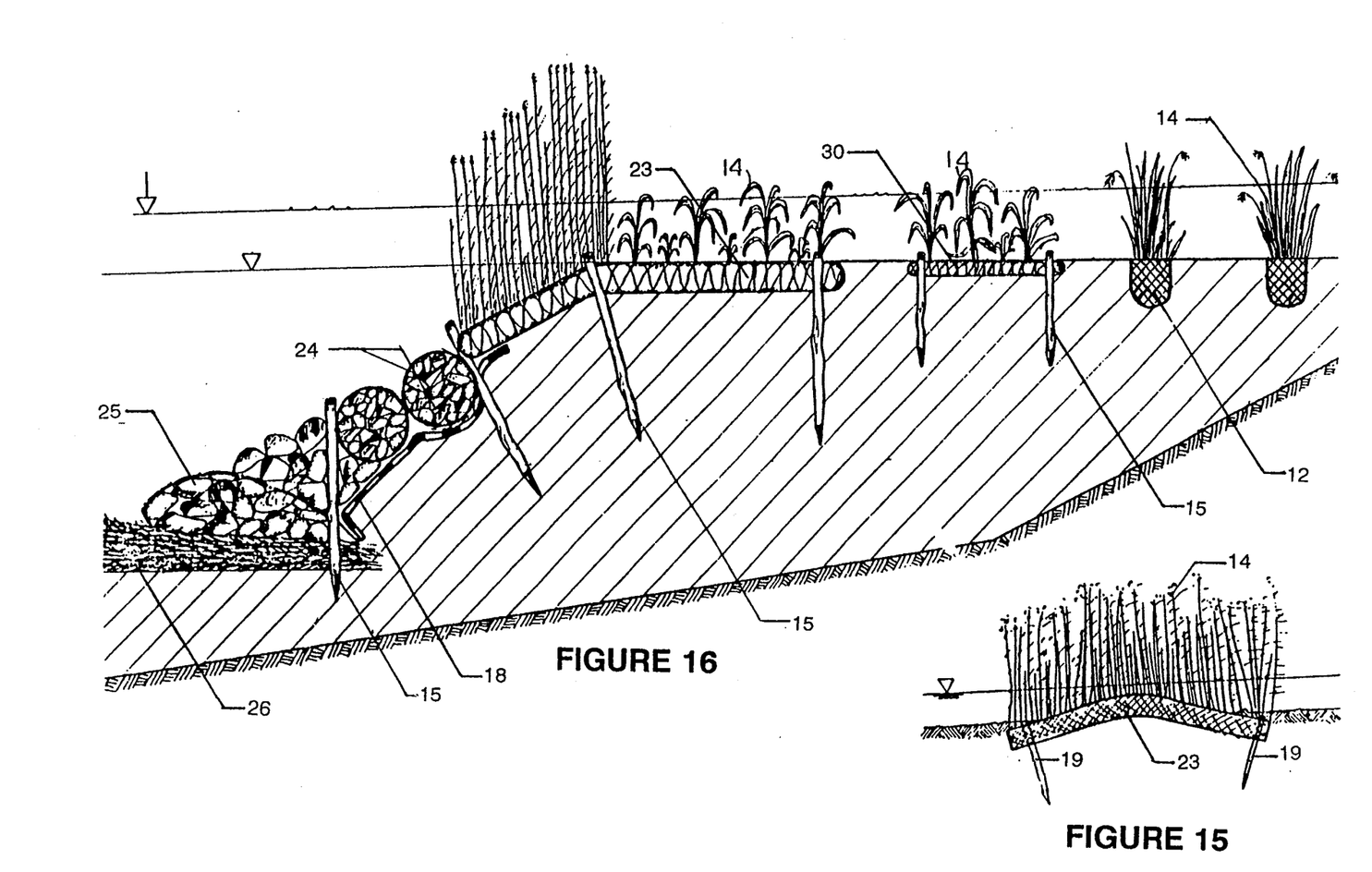
FIG. 15 is a cross-sectional view of still another embodiment of the subject invention.
FIG. 16 is a cross-sectional view of the same embodiment of FIG. 15 in combination with other embodiments.

FIGS. 13, 14, and 15 show still other embodiments of plant ripraps (23). A plant riprap (23) may be secured to a sloping shoreline by stakes (19) as shown in FIGS. 13 and 14, and may also be used to form a submersed dam held in place by stakes (19) as shown in FIG. 15.

Figure 18:
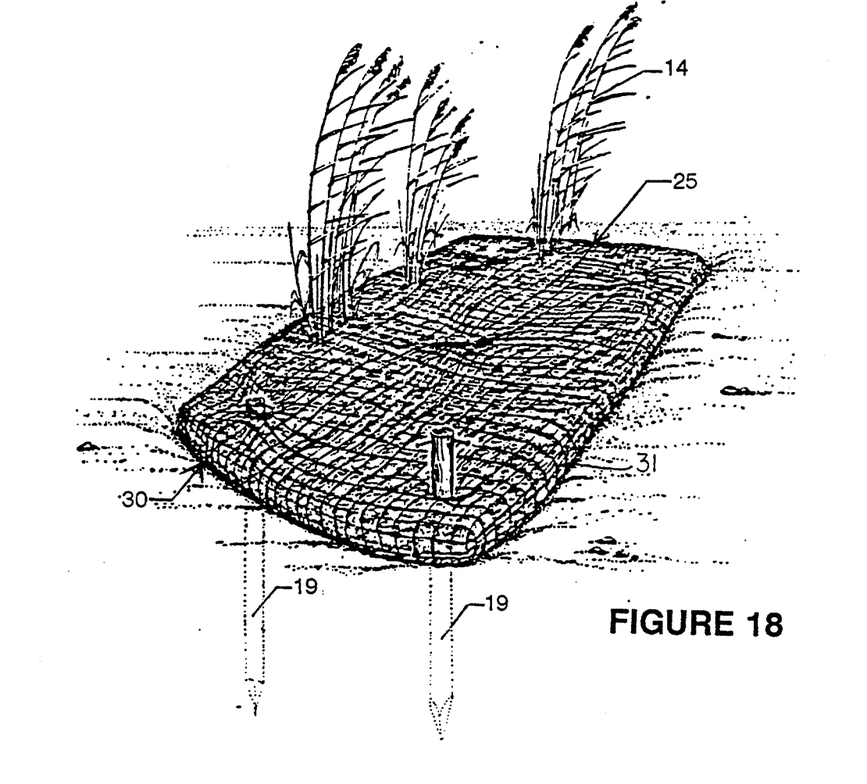
FIG. 18 is an oblique elevational view of the same embodiment of FIG. 17.

FIG. 16 best shows a use of a combined variety of ecological-botanical vegetative carrier systems with construction materials to prevent erosion of a shoreline having multiple topographical features. A layer of stone secured by netting (25) overlies an underwater brush layer (26). A non-woven filter (18) is placed on a sloping portion of the shoreline adjacent to the brush layer (26), and a layer of rock rolls (24) secured by pilings (15) is layered over the non-woven filter (18). Adjacent to the rock rolls (24) and non-woven filter (18) is placed a plant riprap (23) which is secured to the shore by pilings (15). Higher on the shoreline are placed plant pallets (30) also held in place by pilings (15), and plant plugs (12). Plant plugs (12), plants pallets (30), and plant riprap (23) all contain precultivated, emergent aquatic plants (14). As best shown in FIG. 18, a plant pallet (30) comprises precultivated emergent aquatic plants (14 within a substrate (31) surrounded by an outer wrapping of netting (25). Plant pallets (30) preferably range in width from 0.8 to 1.25 meters and have thickness of 4 centimeters or more. Various dimensions can be made to accommodate different shoreline topographies. Plant pallets (30) are usually held in position on a shoreline by stakes (19).

Figure 17:
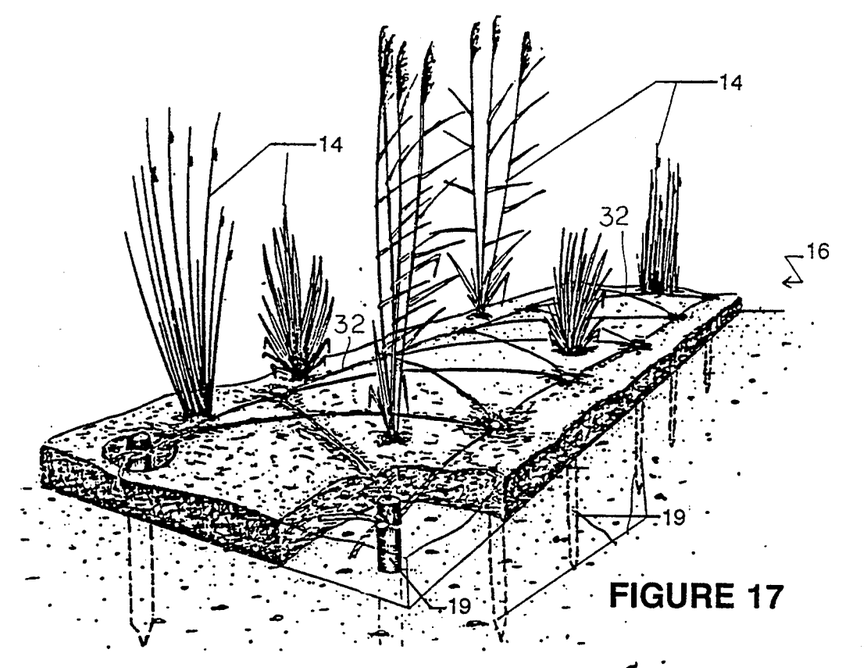
FIG. 17 is an elevational perspective view of still another embodiment of the present invention.

FIG. 17 shows a plant carpet (16) as yet another embodiment. Plant carpets (16) are formed of precultivated, emergent aquatic plants (14) secured during their initial rooting period by ropes (32). With growth, the roots of the precultivated, emergent aquatic plants (14) merge with one another to form plant carpets (16). Preferred widths for plant carpets (16) range from 0.5 to 2.0 meters for ease of rolling and handling. However, any dimensions desired can be achieved by appropriate arrangement of precultivated, emergent aquatic plants (14) at the initial period of growth.

What is claimed is:

1. A method of preparing an arrangement for construction, maintenance and protection of a shoreline having a variable level of water which method comprises:
   a) layering a substrate and emergent aquatic plants onto thick layers of biodegradable non-woven felt;
   b) covering the layers of non-woven felt, substrate and emergent aquatic plants with a non-woven geotextile;
   c) surrounding the layers of non-woven felt, substrate, emergent aquatic plants, and stabilizing the non-woven geotextile to retain its shape;
   d) cultivating said emergent aquatic plants for at least one full vegetation period; and
   e) stabilizing the non-woven geotextile by reinforcement elements thereby forming a protective shoreline vegetative covering.

2. The shoreline vegetative covering arrangement produced by the method of claim 1.

3. A method of preparing a floating fiber roll arrangement for construction, maintenance and protection of a shoreline having a variable level of water which method comprises:
   a) linking a fiber roll means composed of coir material to a supportive buoyancy body;
   b) affixing the buoyancy body immersed into water to an underwater ballast body, to stabilize the position of the fiber roll means at a surface of the water of the shoreline;
   c) positioning the fiber roll means in front of construction material means to prevent erosion on the shoreline by means of a flexible fastening; and
   d) linking a desired number of floating fiber roll means so constructed to form a floating body adaptable to changing water levels.

4. The floating fiber roll arrangement produced by the method of claim 3.

5. An arrangement for the protection of a shoreline having a slope and a variable low and high level of water and subject to erosion, which arrangement comprises in combination:
   a) construction material means on the slope of the shoreline to prevent erosion;
   b) a plurality of adjacent fiber roll means on the slope and arranged and generally longitudinally positioned parallel to the shoreline, and which fiber roll means comprises slowly decaying coir material in roll form, having an exterior surrounding netting material, to maintain the coir material in roll form, and containing therein a plurality of rooted, precultivated, emergent, aquatic plants; and
   c) stake means to secure the plurality of fiber roll means onto the slope of the shoreline in an arranged configuration, to aid in preventing erosion of the shoreline in combination with the construction material means.

6. The arrangement of claim 5 wherein the construction material means are selected from the group consisting of stone riprap, piling, walls, sheet pilings and combinations thereof.

7. The arrangement of claim 5 which includes a plurality of plant plug means to prevent erosion and implanted along the construction material means and each plant plug means comprising at least one rooted, precultivated, emergent, aquatic plant rooted within a biodegradable, water-permeable, vegetative carrier.

8. The arrangement of claim 7 wherein the aquatic plant has a root length to root diameter of at least 1:1.

9. The arrangement of claim 5 wherein the stake means to secure the fiber rolls means includes a plurality of stakes driven into the slope of the shoreline and generally about and adjacent the fiber roll means to retain the fiber roll means in the arranged configuration.

10. The arrangement of claim 5 wherein a plurality of the fiber roll means are secured generally longitudinally adjacent each other by the interweaving of the netting material of the adjacent fiber roll means.

11. The arrangement of claim 5 wherein the construction material comprises stone riprap, wherein the plant plug means are dispersed and implanted among the riprap material and the fiber roll means are disposed on the slope of the shoreline between the low and high water level and secured at a level on the shoreline below the plant plug means.

12. The arrangement of claim 5 wherein a plurality of the fiber roll means are positioned longitudinally adjacent each other and secured by a plurality of stakes driven into the slope of the shoreline, on either side of the adjacent fiber roll means.

13. The arrangement of claim 5 wherein the stake means to secure the fiber roll means includes a plurality of stakes driven into the slope of the shoreline at inclined angles to one another and one either side of the fiber roll means to form an open-ended, generally trapezoidal space therebetween.

14. The arrangement of claim 13 which includes a layer of brush within the trapezoidal space and a plurality of longitudinal, adjacent fiber roll means placed on top of the brush layer and within the trapezoidal space.

15. The arrangement of claim 12 which includes a water submerged bed of stones on the shoreline and secured, adjacent multiple layers of the fiber roll means, one on top of the other, and extending upwardly on the slope from the bed of stones.

16. The arrangement of claim 5 which includes:
   a) a supportive, buoyant body in the water and secured to at least one fiber roll means in the water;
   b) a ballast body in the water and secured to the buoyancy body to stabilize the position of the fiber roll means floating in the water in a selected position to the shoreline and adapted to change with the water level; and
   c) a flexible fastening buoyancy body to secure the ballast body and fiber roll means in the water.

17. The arrangement of claim 16 which includes a sheet piling on the shoreline as a construction material means, the buoyant body connected by the flexible fastener to the sheet piling to secure the selected position of the buoyant body in the water in front of the sheet piling.

18. The arrangement of claim 5 which includes plant riprap means placed on the shoreline, which plant riprap means comprises:
   a) non-woven, biodegradable felt material on the bottom and sides to define a space with an open top;
   b) stone substrate within the open space;
   c) a plurality of precultivated, emergent, aquatic plants rooted in the substrate;
   d) a non-woven, geotextile material covering the top surface of the open space; and
   e) mesh netting material about the non-woven felt and the geotextile material to retain the riprap plant means in a desired shape.

19. The arrangement of claim 18 which includes a plurality of stakes driven into the shoreline and through the plan riprap means to secure the plant riprap means on the shoreline.

20. The arrangement of claim 19 wherein the plant riprap means are secured by stakes on the slope of the shoreline at a level above the fiber roll means.

21. The arrangement of claim 20 includes plant plug means to prevent erosion positioned on the shoreline at a level above the plant riprap means.

22. The arrangement of claim 21 wherein the plant riprap means is generally rectangular in shape and ranges in width from about 0.8 to 1.25 meters and has a height of at least 4 cm.

23. An arrangement for the protection of a shoreline having a slope with a base, and a generally flat top level above the slope and a variable low and high water level, which arrangement comprises in combination:
   a) an underwater brush layer at the base of the slope;
   b) a layer of stone overlying the underwater brush layer;
   c) a non-woven, filter layer on the slope;
   d) a plurality of adjacent rock rolls secured by stakes driven into the slope and through the filter layer;
   e) plant riprap means on the slope above the rock rolls and extending generally to the top flat level of the slope, and secured by stakes driven into the shoreline; and
   f) a plurality of plant plug means planted on the flat top level and adjacent the plant riprap means, which plant plug means comprises at least one precultivated, emergent, aquatic plant rooted within a biodegradable, water-permeable, vegetative carrier.

24. The arrangement of claim 23 which includes a plant pallet material on the flat top level of the shoreline and positioned above the plant riprap means, such plant pallet means comprised of a substrate with a plurality of precultivated, emergent, aquatic plants rooted in the substrate, and the substrate surrounding by an external wrapping of netted mesh material.

25. The method of claim 1 which includes employing a humus-free gravel material as the substrate.

26. The method of claim 1 which includes stabilizing the geotextile material by surrounding the geotextile material with a mesh material as a reinforcement element.

27. The method of claim 1 which includes employing a plurality of the shoreline protective vegetative covering on the slope of the shoreline and securing the protective covering to the slope by stakes driven through the protective covering into the slope.

28. The method of claim 3 which includes providing a fiber roll means having an exterior mesh netting material thereabout and the fiber roll means containing therein a plurality of rooted, precultivated, emergent, aquatic plants.

* * * * *

UNITED STATES PATENT AND TRADEMARK OFFICE
CERTIFICATE OF CORRECTION

PATENT NO. : 5,338,131
DATED : August 16, 1994
INVENTOR(S) : Lothar Bestmann

It is certified that error appears in the above-indentified patent and that said Letters Patent is hereby corrected as shown below:

On title page, item [63] after now abandoned insert —which claims priority from European Patent Appl. No. 92105015.9 filed March 24, 1992—

Signed and Sealed this

Tenth Day of January, 1995

Attest:

BRUCE LEHMAN

Attesting Officer          Commissioner of Patents and Trademarks